UNITED STATES PATENT OFFICE.

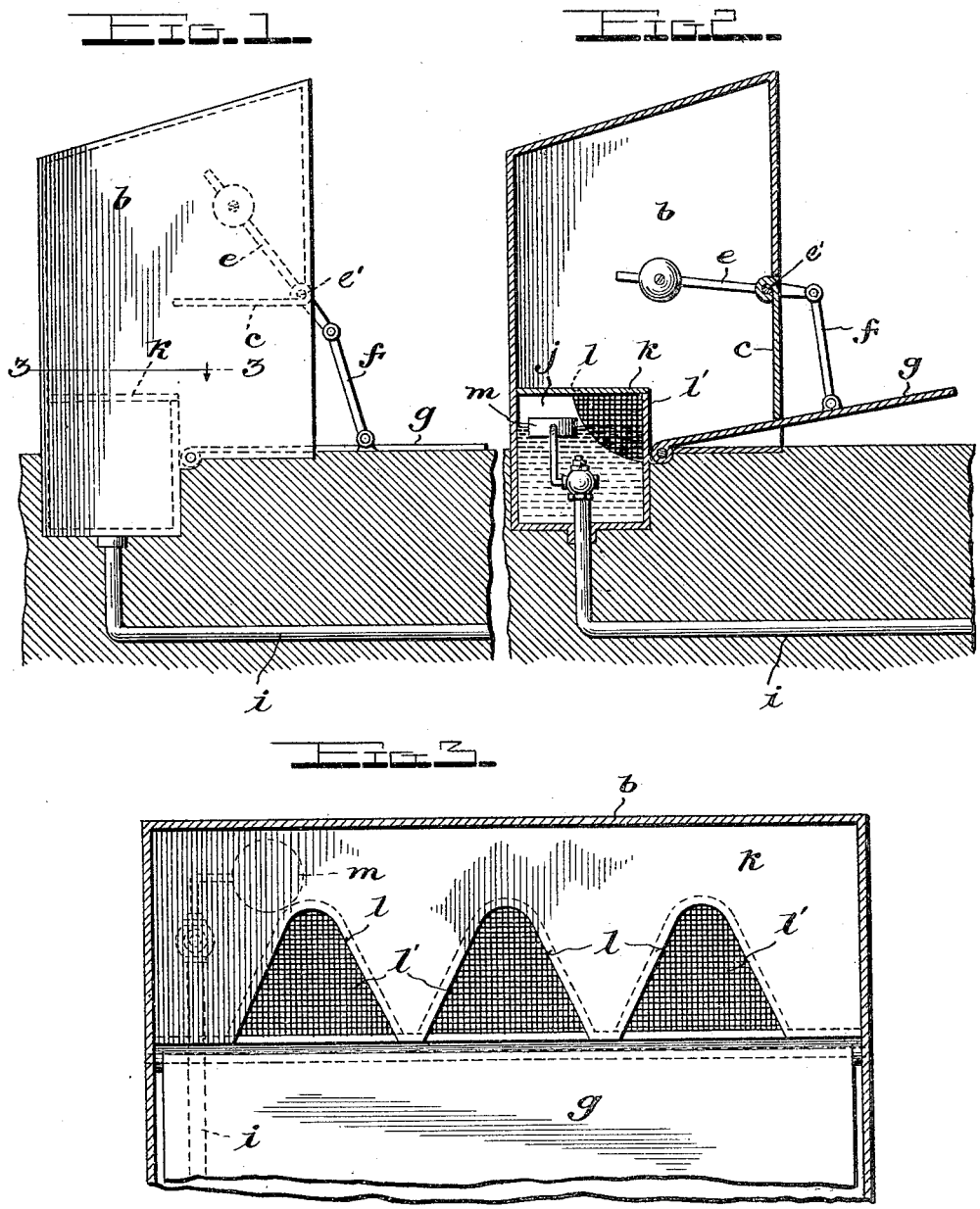

JOHN H. THRELKELD, OF CHARITON, IOWA.

AUTOMATIC STOCK AND POULTRY FOUNTAIN.

1,136,738.  Specification of Letters Patent.  Patented Apr. 20, 1915.

Original application filed September 10, 1913, Serial No. 789,129. Divided and this application filed May 27, 1914. Serial No. 841,277.

*To all whom it may concern:*

Be it known that I, JOHN H. THRELKELD, a citizen of the United States of America, and a resident of Chariton, county of Lucas, State of Iowa, have invented certain new and useful Improvements in Automatic Stock and Poultry Fountains, of which the following is a full and clear specification, reference being had to the accompanying drawings, in which—

Figure 1 is a side elevation of an apparatus constructed in accordance with my invention; Fig. 2 is a vertical sectional view thereof; and Fig. 3 is a detail horizontal sectional view taken on the line 3—3 of Fig. 1.

The object of this invention is to provide a drinking fountain or trough especially for the use of small animals, such as hogs, sheep and poultry, the chief feature of the invention consisting in a pendant door which will, by the weight of the animal when the animal is in drinking position in front of the trough, be caused to open to permit the animal to have access to the water in the trough, as more fully hereinafter set forth.

In the drawings, $b$ designates a housing of the apparatus and $c$ designates a pivotal depending door adapted to close an opening in the lower part of the front wall of the housing. In the lower back part of the housing is mounted a trough $k$, in the top wall of which is formed a series of openings $l$, through which the animal inserts its head or nose when in the act of drinking. The trough is supplied with water through a pipe $i$ which may be connected to any suitable source, the level of the water in the trough being maintained by a valve operated by a float $m$.

Pivoted in front of the trough and extending out through the doorway is a platform $g$ which is kept normally raised at its outer end by means of a counter-weighted lever $e$, which is connected to the platform at a point outside of the housing by means of the upstanding link $f$.

When the animal approaches the fountain to obtain a drink, it steps upon platform $g$ and the counter-weight of the lever is so adjusted that the weight of the animal will be sufficient to depress the platform, as shown in Fig. 1, thus causing the door $c$ to swing inwardly and upwardly, to an approximately horizontal position and thus leave the way clear for the animal to enter the housing a sufficient distance to reach the trough. When the animal backs off the platform, the counter-weight restores the parts to normal position and the door $c$ is caused to swing down and abut against the upwardly swinging platform, thus entirely closing the housing. It will be observed that the counter-weighted lever $e$ is affixed to the door.

Should the water depth in the tank or trough be sufficient to drown a young pig that might fall into the same through the openings $l$, I may provide means to catch and hold it to prevent drowning; I have shown one such device as consisting simply of a wire-mesh cage $l'$ fastened to the top of the tank and depending a few inches below the normal level of the water.

This application is a division of my former application 789,129 filed September 10, 1913, which issued into Letters Patent 1,102,176, dated June 30, 1914.

Having thus described my invention, what I claim is:

1. A drinking fountain of the class set forth, comprising a housing having an opening in its front wall, a trough in the housing, a pivotally depending door closing the opening in the front wall of the housing, a platform pivoted in the housing and extending outwardly through said door opening, and counter-weight means connected to the door and the platform acting to normally close the door and to raise the platform, for the purpose set forth.

2. A drinking fountain of the class set forth, comprising a housing having an opening in its front wall, a trough in the housing, a pivotally depending door closing the opening in the front wall of the housing, a platform pivoted in the housing and extending outwardly through said door opening, and counter-weight means connected to the door and the platform acting to normally close the door and to raise the platform, the lower edge of the door abutting against the upper side of the platform when the door is closed, to thereby completely close the front wall of the housing.

In testimony whereof I hereunto affix my signature in the presence of two witnesses.

JOHN H. THRELKELD.

Witnesses:
J. A. PENICK,
W. C. DONELSON.

Copies of this patent may be obtained for five cents each, by addressing the "Commissioner of Patents, Washington, D. C."